Sept. 3, 1935. H. B. CHAFFIN 2,012,956
PISTON
Filed March 23, 1934 3 Sheets-Sheet 1
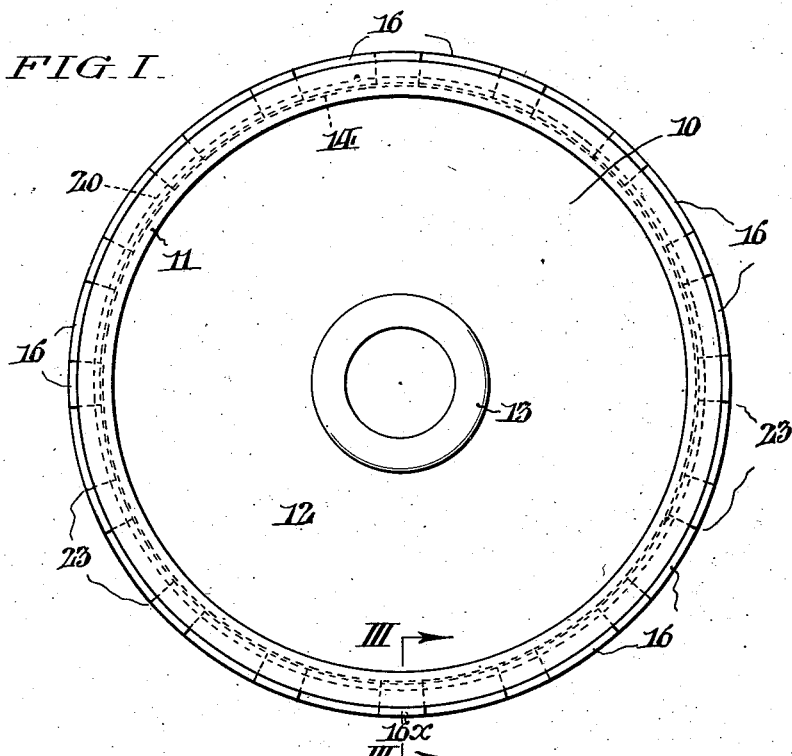
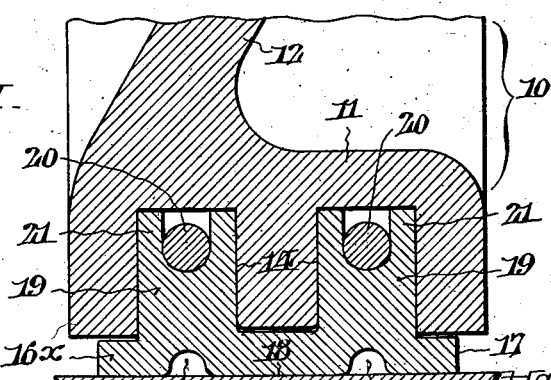
WITNESSES:
INVENTOR:
Harry B. Chaffin
BY
ATTORNEYS.

Sept. 3, 1935.  H. B. CHAFFIN  2,012,956
PISTON
Filed March 23, 1934  3 Sheets-Sheet 2
FIG. IV.
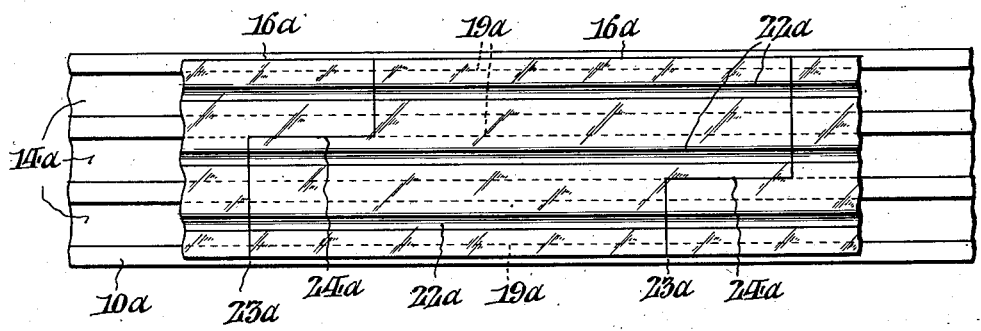
FIG. V.
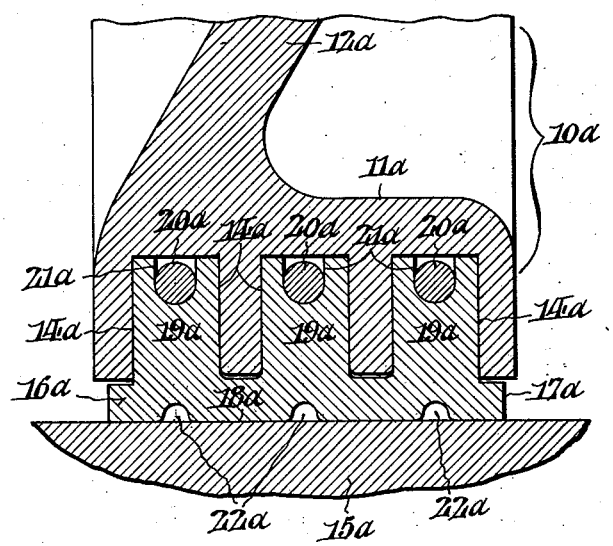
WITNESSES:
INVENTOR:
Harry B. Chaffin
BY
ATTORNEYS.

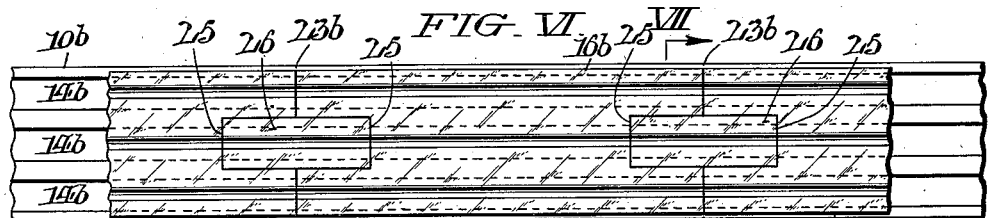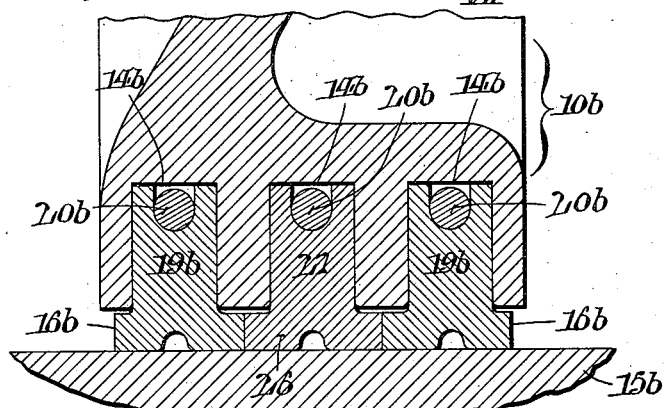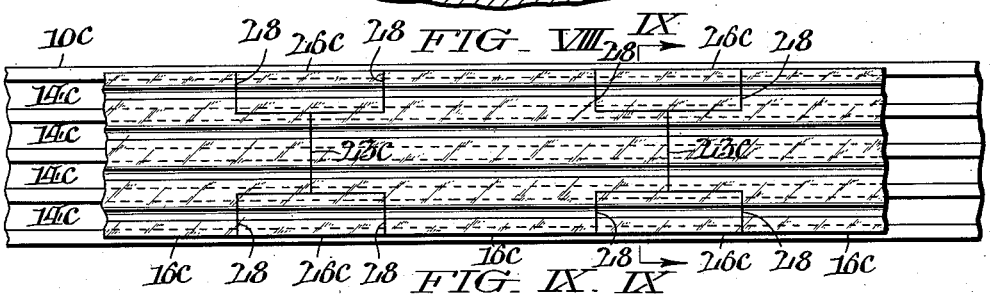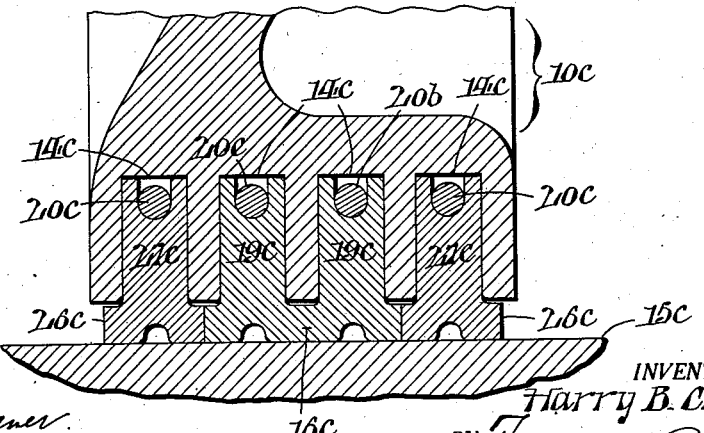

Patented Sept. 3, 1935

2,012,956

UNITED STATES PATENT OFFICE 2,012,956

PISTON

Harry B. Chaffin, Canton, Ohio

Application March 23, 1934, Serial No. 716,937

6 Claims. (Cl. 309—29)

This invention relates to pistons; and it has reference more particularly to piston construction for steam locomotive engines.

In steam locomotives it has been the general practice heretofore to employ bull rings in association with the pistons to hold the latter centralized in the cylinders, as well as separate packing rings to maintain a fluid-tight working seal with the cylinder walls. I am aware that attempts have been made heretofore to dispense with the bull rings, and to devise packings which would serve both as a centering and sealing means. The proposed combination bull and packing rings were, however, unsatisfactory from the standpoint of complicity of parts, difficulty in assembling, and unreliability for the maintenance of a satisfactory seal due to excessive wear upon the cylinder through development of looseness between the component ring parts and the piston.

The chief aim of my invention is to overcome the drawbacks which have been pointed out, or in other words, to afford a combined bull and packing ring which is simple in construction as regards the number of its component parts, and which can be depended upon for fluid tightness over long periods of service as a consequence of strict confinement of the ring parts to radial movement relative to the piston.

Other objects and attendant advantages will be manifest from the following detailed description of the accompanying drawings; wherein, Fig. I shows the face view of a steam locomotive piston conveniently embodying the combined bull and packing ring of my invention.

Fig. II is a fragmentary detail view, on a larger scale, showing the outer surface of the ring in linear development.

Fig. III is a fragmentary detail cross sectional view of the ring, taken as indicated by the arrows III—III in Fig. I, and drawn to a larger scale.

Figs. IV and V are views corresponding to Figs. II and III, showing a modified form of my invention; and, Figs. VI, VII and VIII, IX are views, also corresponding respectively to Figs. II and III, showing further modifications of my invention.

With detailed reference first more particularly to Figs. I–III of these illustrations, the numeral 10 designates the piston which has a relatively broad peripheral portion 11 integrally joined by a continuous dished web 12 with a central boss or hub 13. As shown in Fig. III the piston 10 is formed with a pair of laterally-spaced rectangular section circumferential grooves 14 whereof the depth is considerably greater than the width.

In order to hold the piston 10 centered in the engine cylinder and at the same time insure a fluid tight working joint between it and the cylinder wall 15 (Fig. III), in accordance with my invention I have provided a combined bull-and-packing ring which, as will be observed from Figs. I and II, is composed of a number of interchangeable arcuate segments 16, 16x. The segment 16x which lies at the bottom of the piston 10 has an arcuate length exactly twice that of the others, and, by virtue of its position, supports most of the weight of said piston. As best shown in Fig. III, the combined bull-and-packing ring has a face portion 17 which is substantially as wide as the piston 10, and which overlies the periphery of said piston, thereby filling the space between the piston periphery and the cylinder wall 15 with its outer surface 18 bearing full against said cylinder wall 15. The combined bull-and-packing ring moreover has internally thereof, a pair of laterally-spaced circumferential ridges 19 which are rectangular in cross section and proportioned to snugly fit within, and to substantially fill circumferential grooves 14 of the piston 10. A pair of split, round section, annular expander springs 20 engaging inwardly-open central grooves 21 in the ridges 19, urge the ring segments 16 uniformly outward into intimate fluid-tight contact with the cylinder wall 15, and also assist in maintaining said segments accurately in circumferential alignment. For the better lubrication of the piston 10, the combined bull-and-packing ring is formed with oil grooves 71 in its outer face 18, said oil grooves being respectively on center with the ribs or ridges 19, as shown in Fig. III. At opposite ends, the ring segments 16 are rabbetted, as at 23 in Fig. II, for overlapping-engagement and the formation of fluid-tight working joints between them, the longitudinal faces 24 of said joints being in this instance all aligned in the central plane of the ring.

Due to the integral formation of the ring segments 16, 16x with two ridges 19 proportioned as above described, the force of the lateral thrust imposed upon the ring by steam pressure acting on the piston 10, will obviously be communicated to, and proportionately absorbed by the walls of the grooves 14 in said piston. Furthermore, since the contacting areas of the ridges 19 and the sides of the grooves 14 are relatively large and well spaced laterally, the ring segments 16, 16x are strictly confined to radial movement, with consequent effective minimization of wear in the piston groves 14 and preclusion of any relative rocking movement which would cause rapid wear between the ring and the cylinder wall 15, and result in steam leakage past the piston 10 as was the case with the single ridge rings heretofore usually employed in the art. A further advantage of the above construction is that the radial thrust of the combined bull-and-packing ring is evenly distributed by the joint action of the two split annular expander springs 20, so that a uniform pressure is maintained between the outer face of the ring segments 16, 16x and the cylinder wall 15 all around.

In the embodiment of my invention illustrated in Figs. IV and V, the piston 10a is formed with three rectangular section circumferential grooves 14a, and the combined bull-and-packing ring with a corresponding number of ridges 19a to engage the piston grooves 14a. The companion segments 16a of the ring overlap at their ends in the same manner as before; but it will be noted from Fig. IV that, in this case, the longitudinal lap faces 24a of successive joints 22a, are respectively in line with the opposite faces of the central one of the ridges 19a. This construction avoids splits medially of the groove 14a for the central expander spring 20a. Except as above noted, the modified construction of Figs. IV and V is similar in its design and operation to that of the first described embodiment, and therefore, in order to preclude the necessity for repetitive description, the same reference numerals have been employed to designate corresponding parts, the exponent a having however been additionally applied in each instance for the purpose of distinction.

In Figs. VI and VII, I have illustrated a combined bull-and-packing ring for a piston 10b having three circumferential grooves 14b. In this instance, the segments 16b of the ring have registering end recesses 25 which jointly provide spaces for the reception of snugly-fitting supplemental segments 26 to lap the junctures 23b between the abutting faces of the main segments. Each supplemental segment 26, it will be observed from Fig. VII, has a segmental ridge 27 to engage the central one of the three circumferential grooves 14b in the piston 10b; while each main segment 16b has three ridges 19b to engage all of the piston grooves 14b. Due to their allocation medially of the piston assemblage, the supplemental segments 26 are subject to the central one of the three expander springs 20b, which latter collectively exert their influence upon the main segments 16b so that all the components of the combined bull-and-packing ring are yieldingly held against the cylinder wall 15b for maintenance of a fluid tight working seal.

Figs. VIII and IX show my invention embodied in a piston 10c having four circumferential grooves 14c. Here, the main segments 16c of the combined bull-and-packing ring are recessed at their corners as at 28, with resultant provision of spaces along opposite side edges of the piston 10c for the reception of snugly-fitting supplemental segments 26c to lap the junctures 23c between the abutting end faces of contiguous main segments 16c. In this modification, the single ridges 27c of the supplemental segments 26c along the opposite side edges of the piston 10c, respectively engage the outermost ones of the circumferential grooves 14c, whereas the main segments 16c each have four ridges 19c to engage all of the circumferential piston grooves 14c. As shown in Fig. IX the supplemental segments 16c are influenced by the outermost ones of the four expander rings 20c, which latter all operate in common upon the main segments 16c to keep them yieldingly in fluid-tight contact with the cylinder wall 16c.

The alternative forms of my invention featured in Figs. VI, VII and VIII, IX are advantageous in that they favor more economical construction of the combined bull-and-packing ring, since the main segments 16b and 16c can all be cut from a preformed annular machined blank without wastage except for that occasioned by the end recesses at 25 or 28. The ring segments for the forms of my invention shown in Figs. I, III and IV, V, on the other hand, obviously cannot all be produced from a single annular blank on account of the offset formation of their opposite ends.

From the foregoing it is evident that I have provided a combined bull-and-packing ring which is composed of relatively few parts; which is easily and quickly assembled; which is likewise easily and quickly introduced into the cylinder initially, as well as readily withdrawn from the cylinder when replacement becomes necessary; which is self lubricating; and which can be relied upon to maintain an efficient fluid-tight seal between the piston and the cylinder wall over a long period of service.

Having thus described my invention, I claim:

1. The combination with a piston having a number of laterally-spaced rectangular section circumferential grooves in its periphery; of a combined bull-and-packing ring having a face portion corresponding substantially in width to, and overlapping the periphery of the piston, said ring being composed of overlapping arcuate segments jointly providing a plurality of laterally spaced rectangular section circumferential internal ridges to snugly fit the circumferential grooves of the piston, each said ridge having an inwardly-open groove, and annular expander means engaged in such grooves to yieldingly maintain the ring segments in fluid tight contact with a cylinder wall.

2. The combination with a piston having a number of laterally-spaced rectangular-section circumferential grooves in its periphery of a depth in excess of their width; of a combined bull-and-packing ring having a face portion corresponding substantially in width to, and overlapping the periphery of the piston, said ring being composed of overlapping arcuate segments jointly providing a plurality of laterally-spaced rectangular section internal ridges of rectangular cross section proportioned to fit snugly into and to substantially fill the circumferential grooves of the piston, the respective ridges each having an inwardly-open groove, and an expander ring in each of the grooves to yieldingly maintain the ring segments in fluid tight contact with a cylinder wall.

3. The combination with a piston having a number of laterally-spaced rectangular-section circumferential grooves in its periphery; of a combined bull-and-packing ring having a face portion corresponding substantially in width to, and overlying the periphery of the piston, said ring being composed of overlapping arcuate segments jointly providing internal laterally-spaced rectangular section circumferential ridges to snugly fit the circumferential grooves of the piston, and split annular expander rings lodged in central circumferential grooves of the ridges of the ring for capacity to uniformly urge the ring segments into fluid tight contact with a cylinder wall.

4. A piston in accordance with claim 3 wherein the piston has an uneven number of grooves and the combined bull-and-packing ring a corresponding number of internal ridges, and wherein the circumferential overlap joints are of rabbetted form with the longitudinal surface contact at opposite ends of the ring components lying in the planes of the opposite sides of the central one of the ridges aforesaid.

5. A piston for horizontal cylinders in accordance with claim 1 wherein the lowermost arcuate segment of the circumferential series is of greater arcuate extent than the others for capacity to better support the major part of the weight of the piston.

6. The combination with a piston having a number of laterally-spaced rectangular section circumferential grooves in its periphery; of a combined bull-and-packing ring having a face portion corresponding substantially in width to, and overlapping the periphery of the piston, said ring being composed of a number of abutting main segments, and a number of supplemental segments to overlap the crosswise junctures between the main segments, said main and supplemental segments jointly providing laterally-spaced rectangular section circumferential internal ridges to snugly fit the circumferential grooves of the pistons, the respective ridges each having an inwardly-open groove, and a split expander ring in each of the grooves to yieldingly maintain all the ring segments in fluid tight contact with the cylinder wall.

HARRY B. CHAFFIN.